US010691187B2

(12) United States Patent
Lakshman et al.

(10) Patent No.: US 10,691,187 B2
(45) Date of Patent: *Jun. 23, 2020

(54) PERSISTENT RESERVATIONS FOR VIRTUAL DISK USING MULTIPLE TARGETS

(71) Applicant: Commvault Systems, Inc., Tinton Falls, NJ (US)

(72) Inventors: Avinash Lakshman, Fremont, CA (US); Abhijith Shenoy, Sunnyvale, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,014

(22) Filed: Feb. 12, 2019

(65) Prior Publication Data

US 2019/0171264 A1 Jun. 6, 2019

Related U.S. Application Data

(63) Continuation of application No. 15/163,446, filed on May 24, 2016, now Pat. No. 10,248,174.

(51) Int. Cl.
*G06F 12/00* (2006.01)
*G06F 1/24* (2006.01)
*G06F 9/455* (2018.01)

(52) U.S. Cl.
CPC ............ *G06F 1/24* (2013.01); *G06F 9/45558* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

EP 0259912 3/1988
EP 0405926 1/1991
(Continued)

OTHER PUBLICATIONS

International Search Report dated Jan. 13, 2016 from International Application No. PCT/US2015/038687.
(Continued)

*Primary Examiner* — Jason W Blust
(74) *Attorney, Agent, or Firm* — Commvault Systems, Inc.

(57) ABSTRACT

An application within a virtual machine is an iSCSI Initiator and is allowed to use as an iSCSI Target another virtual machine within the same hypervisor in order to make a persistent reservation for a virtual disk within a remotely-located storage platform. Any number of virtual machines within different hypervisors, and perhaps on different computers, use a local controller virtual machine to make a persistent reservation for the same virtual disk. The registration list and the current reservation holder data for an iSCSI persistent reservation for a particular virtual disk are held on a storage node of the storage platform rather than within a single virtual machine of a remote computer. A metadata module on the storage platform handles the incoming requests. A coordinator module within the storage platform uses a lock mechanism to guarantee that the reserve, release, preempt and clear commands are handled properly.

20 Claims, 10 Drawing Sheets

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,473,774 B1 | 10/2002 | Cellis |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,076,509 B1 | 7/2006 | Chen et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,373,451 B2 | 5/2008 | Lam et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,653,669 B2 | 1/2010 | Kapoor et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 7,925,624 B2 | 4/2011 | Vosshall et al. |
| 8,001,322 B2 | 8/2011 | Lecomte et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,260,751 B2 | 9/2012 | Johnson et al. |
| 8,285,681 B2 | 10/2012 | Prahlad et al. |
| 8,307,177 B2 | 11/2012 | Prahlad et al. |
| 8,312,046 B1 | 11/2012 | Eisler et al. |
| 8,364,639 B1 | 1/2013 | Koryakina et al. |
| 8,364,652 B2 | 1/2013 | Vijayan et al. |
| 8,370,542 B2 | 2/2013 | Lu et al. |
| 8,386,838 B1 | 2/2013 | Byan |
| 8,413,142 B2 | 4/2013 | Sharp et al. |
| 8,453,145 B1 | 5/2013 | Naik |
| 8,458,422 B1 | 6/2013 | Holdman et al. |
| 8,578,120 B2 | 11/2013 | Attarde et al. |
| 8,601,473 B1 | 12/2013 | Aron et al. |
| 8,706,867 B2 | 4/2014 | Vijayan |
| 8,707,070 B2 | 4/2014 | Muller |
| 8,762,430 B1 | 6/2014 | Hall |
| 8,850,130 B1 | 9/2014 | Aron et al. |
| 8,861,527 B1 | 10/2014 | Bao et al. |
| 8,892,549 B1 | 11/2014 | Thakur |
| 8,950,009 B2 | 2/2015 | Vijayan et al. |
| 8,954,446 B2 | 2/2015 | Vijayan Retnamma et al. |
| 9,009,106 B1 | 4/2015 | Aron et al. |
| 9,020,900 B2 | 4/2015 | Vijayan Retnamma et al. |
| 9,053,339 B2 | 6/2015 | Pate et al. |
| 9,098,495 B2 | 8/2015 | Gokhale |
| 9,116,633 B2 | 8/2015 | Sancheti et al. |
| 9,189,170 B2 | 11/2015 | Kripalani et al. |
| 9,239,687 B2 | 1/2016 | Vijayan et al. |
| 9,262,496 B2 | 2/2016 | Kumarasamy et al. |
| 9,286,110 B2 | 3/2016 | Mitkar et al. |
| 9,311,121 B2 | 4/2016 | Deshpande et al. |
| 9,378,035 B2 | 6/2016 | Kripalani |
| 9,424,151 B2 | 8/2016 | Lakshman et al. |
| 9,461,881 B2 | 10/2016 | Kumarasamy et al. |
| 9,483,205 B2 | 11/2016 | Lakshman |
| 9,495,404 B2 | 11/2016 | Kumarasamy et al. |
| 9,558,085 B2 | 1/2017 | Lakshman |
| 9,575,673 B2 | 2/2017 | Mitkar et al. |
| 9,633,033 B2 | 4/2017 | Vijayan et al. |
| 9,639,274 B2 | 5/2017 | Maranna et al. |
| 9,641,388 B2 | 5/2017 | Kripalani et al. |
| 9,652,265 B1 | 5/2017 | Narayanasamy et al. |
| 9,710,465 B2 | 7/2017 | Dornemann et al. |
| 9,798,489 B2 | 10/2017 | Lakshman et al. |
| 9,875,063 B2 | 1/2018 | Lakshman |
| 9,977,687 B2 | 5/2018 | Kottomtharayil et al. |
| 9,983,936 B2 | 5/2018 | Dornemann et al. |
| 10,067,722 B2 | 9/2018 | Lakshman |
| 10,084,873 B2 | 9/2018 | Dornemann |
| 10,162,528 B2 | 12/2018 | Sancheti et al. |
| 10,210,048 B2 | 2/2019 | Sancheti |
| 10,228,962 B2 | 3/2019 | Dornemann et al. |
| 10,248,174 B2 | 4/2019 | Lakshman et al. |
| 10,296,368 B2 | 5/2019 | Dornemann et al. |
| 10,346,259 B2 | 7/2019 | Gokhale et al. |
| 2002/0019908 A1 | 2/2002 | Reuter et al. |
| 2002/0133669 A1 | 9/2002 | Devireddy et al. |
| 2003/0145167 A1 | 7/2003 | Tomita |
| 2003/0182494 A1 | 9/2003 | Rodrigues et al. |
| 2004/0098373 A1 | 5/2004 | Bayliss |
| 2004/0250033 A1 | 12/2004 | Prahlad et al. |
| 2005/0108292 A1 | 5/2005 | Burton et al. |
| 2005/0246393 A1 | 11/2005 | Coates et al. |
| 2005/0246397 A1 | 11/2005 | Edwards et al. |
| 2005/0256972 A1 | 11/2005 | Cochran et al. |
| 2006/0168402 A1 | 7/2006 | Ahmad et al. |
| 2006/0224846 A1 | 10/2006 | Amarendran et al. |
| 2007/0038888 A1 | 2/2007 | Kariv |
| 2007/0106706 A1 | 5/2007 | Ahrens et al. |
| 2008/0183973 A1 | 7/2008 | Aguilera et al. |
| 2008/0201535 A1 | 8/2008 | Hara |
| 2008/0244028 A1 | 10/2008 | Le et al. |
| 2009/0210875 A1 | 8/2009 | Bolles et al. |
| 2009/0217265 A1 | 8/2009 | Ishikawa |
| 2009/0282404 A1 | 11/2009 | Khandekar et al. |
| 2009/0319534 A1 | 12/2009 | Gokhale |
| 2010/0058013 A1 | 3/2010 | Gelson |
| 2010/0199126 A1 | 8/2010 | Noguchi et al. |
| 2010/0223368 A1 | 9/2010 | Runcie et al. |

(56) References Cited

U.S. PATENT DOCUMENTS

| | | |
|---|---|---|
| 2010/0257403 A1 | 10/2010 | Virk et al. |
| 2011/0185355 A1 | 7/2011 | Chawla et al. |
| 2011/0246984 A1 | 10/2011 | Sharp et al. |
| 2011/0265083 A1 | 10/2011 | Davis |
| 2012/0084598 A1 | 4/2012 | Alibakhsh et al. |
| 2012/0110275 A1 | 5/2012 | Ganti et al. |
| 2012/0110328 A1 | 5/2012 | Pate et al. |
| 2012/0150818 A1 | 6/2012 | Vijayan Retnamma et al. |
| 2012/0150826 A1 | 6/2012 | Vijayan Retnamma et al. |
| 2012/0323853 A1 | 12/2012 | Fries et al. |
| 2013/0007183 A1 | 1/2013 | Sorenson, III et al. |
| 2013/0007436 A1 | 1/2013 | Bookman et al. |
| 2013/0055371 A1 | 2/2013 | Kumano et al. |
| 2013/0086018 A1 | 4/2013 | Horii |
| 2013/0111471 A1 | 5/2013 | Chandrasekaran |
| 2013/0117337 A1 | 5/2013 | Dunham |
| 2013/0166849 A1 | 6/2013 | Beukema et al. |
| 2013/0191577 A1 | 7/2013 | Thomas et al. |
| 2013/0227552 A1 | 8/2013 | Reddin |
| 2013/0239106 A1 | 9/2013 | Srinivasan et al. |
| 2013/0262387 A1 | 10/2013 | Varadharajan et al. |
| 2013/0263114 A1 | 10/2013 | Watkins et al. |
| 2013/0305002 A1 | 11/2013 | Hallak et al. |
| 2013/0326053 A1 | 12/2013 | Bauer et al. |
| 2013/0339407 A1 | 12/2013 | Sharpe |
| 2013/0346709 A1 | 12/2013 | Wang |
| 2014/0040206 A1 | 2/2014 | Ramakrishnan et al. |
| 2014/0059292 A1 | 2/2014 | Phelan et al. |
| 2014/0059375 A1 | 2/2014 | Mcelhoe et al. |
| 2014/0156925 A1 | 6/2014 | Baron et al. |
| 2014/0173181 A1 | 6/2014 | Beveridge |
| 2014/0181397 A1 | 6/2014 | Bonzini |
| 2014/0188825 A1 | 7/2014 | Muthukkaruppan et al. |
| 2014/0196038 A1 | 7/2014 | Kottomtharayil et al. |
| 2014/0201140 A1 | 7/2014 | Vibhor et al. |
| 2014/0201157 A1 | 7/2014 | Pawar et al. |
| 2014/0201170 A1 | 7/2014 | Vijayan et al. |
| 2014/0282509 A1 | 9/2014 | Zheng et al. |
| 2014/0317618 A1 | 10/2014 | Behera et al. |
| 2014/0324793 A1 | 10/2014 | Glazemakers |
| 2014/0344809 A1 | 11/2014 | Jin et al. |
| 2014/0365549 A1 | 12/2014 | Jenkins |
| 2014/0379983 A1 | 12/2014 | Sasaki |
| 2015/0074536 A1 | 3/2015 | Varadharajan et al. |
| 2015/0088586 A1 | 3/2015 | Pavlas et al. |
| 2015/0127658 A1 | 5/2015 | Ding |
| 2015/0134616 A1 | 5/2015 | Zheng et al. |
| 2015/0227535 A1 | 8/2015 | Avati |
| 2015/0370495 A1 | 12/2015 | Georgiev |
| 2016/0132400 A1 | 5/2016 | Pawar et al. |
| 2016/0142485 A1 | 5/2016 | Mitkar et al. |
| 2016/0202916 A1 | 7/2016 | Cui et al. |
| 2016/0350302 A1 | 12/2016 | Lakshman |
| 2016/0350391 A1 | 12/2016 | Vijayan et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0262347 A1 | 9/2017 | Dornemann et al. |
| 2018/0095846 A1 | 4/2018 | Sanakkayala et al. |
| 2018/0137139 A1 | 5/2018 | Bangalore et al. |
| 2018/0143879 A1 | 5/2018 | Dornemann |
| 2018/0253361 A1 | 9/2018 | Dhatrak |
| 2018/0276085 A1 | 9/2018 | Mitkar et al. |
| 2018/0285202 A1 | 10/2018 | Bhagi et al. |
| 2018/0285205 A1 | 10/2018 | Mehta et al. |
| 2018/0373597 A1 | 12/2018 | Rana |
| 2019/0278662 A1 | 9/2019 | Nagrale et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2001/061507 | 8/2001 |
| WO | WO 2006/052872 | 5/2006 |
| WO | WO 2014/008495 | 1/2014 |

OTHER PUBLICATIONS

Written Opinion dated Jan. 13, 2016 from International Application No. PCT/US2015/038687.
SwiftStack, Inc., "The OpenStack Object Storage System", Feb. 2012, pp. 1-29.
Office Action dated Oct. 12, 2018, for U.S. Appl. No. 14/723,380.
Office Action dated Sep. 1, 2017, for U.S. Appl. No. 14/723,380.
Office Action dated Jul. 3, 2017, for U.S. Appl. No. 15/155,838.
Office Action dated Jul. 6, 2017, for U.S. Appl. No. 15/156,015.
Office Action dated Feb. 8, 2018, for U.S. Appl. No. 15/156,015.
Office Action dated Nov. 17, 2018, for U.S. Appl. No. 15/156,015.
Office Action dated Nov. 19, 2018, for U.S. Appl. No. 15/155,838.
Office Action dated Feb. 8, 2018, for U.S. Appl. No. 15/155,838.
Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review Sigops, vol. 25, No. 5, May 1991, New York, US, pp. 1-15.
U.S. Appl. No. 16/121,883, filed Sep. 5, 2018, title: Data Migration Using Stubs, Applicant: Commvault Systems, Inc.
U.S. Appl. No. 16/378,328, filed Apr. 8, 2019, title: Power Management of Components Within a Storage Management System, Applicant: Commvault Systems, Inc.
U.S. Appl. No. 16/262,721, filed Jan. 30, 2019, title: Cross-Hypervisor Live Mount of Backed Up Virtual Machine Data, Applicant: Commvault Systems, Inc.
U.S. Appl. No. 16/253,643, filed Jan. 22, 2019, title: File Indexing for Virtual Machine Backups Based on Using Live Browse Features, Applicant: Commvault Systems, Inc.
U.S. Appl. No. 16/568,075, filed Sep. 11, 2019, title: Data Protection Component Scaling in a Cloud-Based Data Storage System, Applicant: Commvault Systems, Inc.
Final Office Action dated Aug. 7, 2019 for U.S. Appl. No. 15/155,838.
Office Action dated Mar. 19, 2020 for U.S. Appl. No. 15/155,838.
Final Office Action dated Aug. 8, 2019 for U.S. Appl. No. 15/156,015.
Office Action dated Jan. 9, 2020 for U.S. Appl. No. 15/156,015.

PERSISTENT RESERVATIONS FOR VIRTUAL DISK USING MULTIPLE TARGETS

CROSS-REFERENCE TO RELATED APPLICATIONS

This application is a continuation of U.S. patent application Ser. No. 15/163,446 filed May 24, 2016, entitled "PERSISTENT RESERVATIONS FOR VIRTUAL DISK USING MULTIPLE TARGETS," which is hereby incorporated by reference.

This application is related to U.S. patent application Ser. Nos. 14/322,813, 14/322,832, 14/684,086, 14/322,850, 14/322,855, 14/322,867, 14/322,868, 14/322,871, and 14/723,380, which are all hereby incorporated by reference.

FIELD OF THE INVENTION

The present invention relates generally to data storage within a data center. More specifically, the present invention relates to reserving a virtual disk within a data center using multiple virtual machines.

BACKGROUND OF THE INVENTION

In the field of data storage, enterprises have used a variety of techniques in order to store the data that their software applications use. At one point in time, each individual computer server within an enterprise running a particular software application (such as a database or e-mail application) would store data from that application in any number of attached local disks. Although this technique was relatively straightforward, it led to storage manageability problems in that the data was stored in many different places throughout the enterprise.

These problems led to the introduction of the storage area network in which each computer server within an enterprise communicated with a central storage computer node that included all of the storage disks. The application data that used to be stored locally at each computer server was now stored centrally on the central storage node via a fiber channel switch, for example. Although such a storage area network was easier to manage, changes in computer server architecture created new problems.

With the advent of virtualization, each computer server can now host dozens of software applications through the use of a hypervisor on each computer server and the use of virtual machines. Thus, computer servers which had been underutilized could now host many different server applications, each application needing to store its data within the storage area network. Weaknesses in the storage area network were revealed by the sheer number of server applications needing to access disks within the central storage node.

For example, the same application executing on different hypervisors (whether on different computers or not) is required to use the same target virtual machine (under the iSCSI protocol) when accessing a particular virtual disk. This causes latency issues and may cause a computer or virtual machine to crash. Improvements are needed in order to provide greater efficiency and to ensure continual access to storage data in the cloud by remote applications.

SUMMARY OF THE INVENTION

To achieve the foregoing, and in accordance with the purpose of the present invention, methods and a system are disclosed that provide the advantages discussed below. For one, any number of virtual machines operating within different hypervisors (and perhaps on different computers) are allowed to access the same virtual disk within a storage platform using a virtual machine within their own hypervisor. It is not necessary for various virtual machines on different hypervisors to use the same virtual machine within a single hypervisor to access the virtual disk. Each virtual machine acts as an iSCSI Initiator and it treats a controller virtual machine within its own hypervisor as an iSCSI Target. Moreover, the registration list and current reservation holder information for a particular virtual disk are stored within the storage platform itself rather than within a virtual machine of the remote computer that hosts an application. And, a coordinator module within the storage platform implements a lock mechanism in order to coordinate the requests from the various virtual machines to reserve a virtual disk, release a reservation for a virtual disk, or preempt a reservation for virtual disk.

In a first embodiment, a method reserves a virtual disk in a storage platform having a number of storage nodes. The method begins by receiving a request at a first process on one of the storage nodes to reserve a specific virtual disk in said storage platform. The request originates at an iSCSI Initiator virtual machine of a remote computer and comes via an iSCSI Target of said remote computer. The first process requests of a coordinator process on one of said storage nodes a lock for the specific virtual disk. The coordinator process gives the lock to the first process. Thus, an application of the virtual machine is able to write to, or read from, the virtual disk.

In a second embodiment, a method releases a reservation for a virtual disk in a storage platform having a number of storage nodes. The method begins by receiving a request at a first process on one of the storage nodes to release a reservation for a specific virtual disk in the storage platform. The request originates at an iSCSI Initiator virtual machine of a remote computer and comes via an iSCSI Target of the remote computer. The first process requests of a coordinator process on one of the storage nodes a lock for the specific virtual disk. The coordinator process gives it the lock to the first process, and then the first process resets a current reservation holder field in persistent storage on one of the storage nodes that pertains to the specific virtual disk.

In a third embodiment, a method of preempting a reservation for a virtual disk in a storage platform having a number of storage nodes begins by receiving a request at a first process on one of the storage nodes to preempt a reservation for a specific virtual disk in the storage platform. The request originates at an iSCSI Initiator virtual machine of a remote computer and comes via an iSCSI Target of the remote computer. The first process requests of a coordinator process on one of said storage nodes a lock for the specific virtual disk. The coordinator process giving the lock to the first process, and then the first process sets a current reservation holder field in persistent storage on one of the storage nodes that pertains to the specific virtual disk. The current reservation holder field is set to identify the iSCSI Initiator virtual machine.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Storage System

Figure 1:
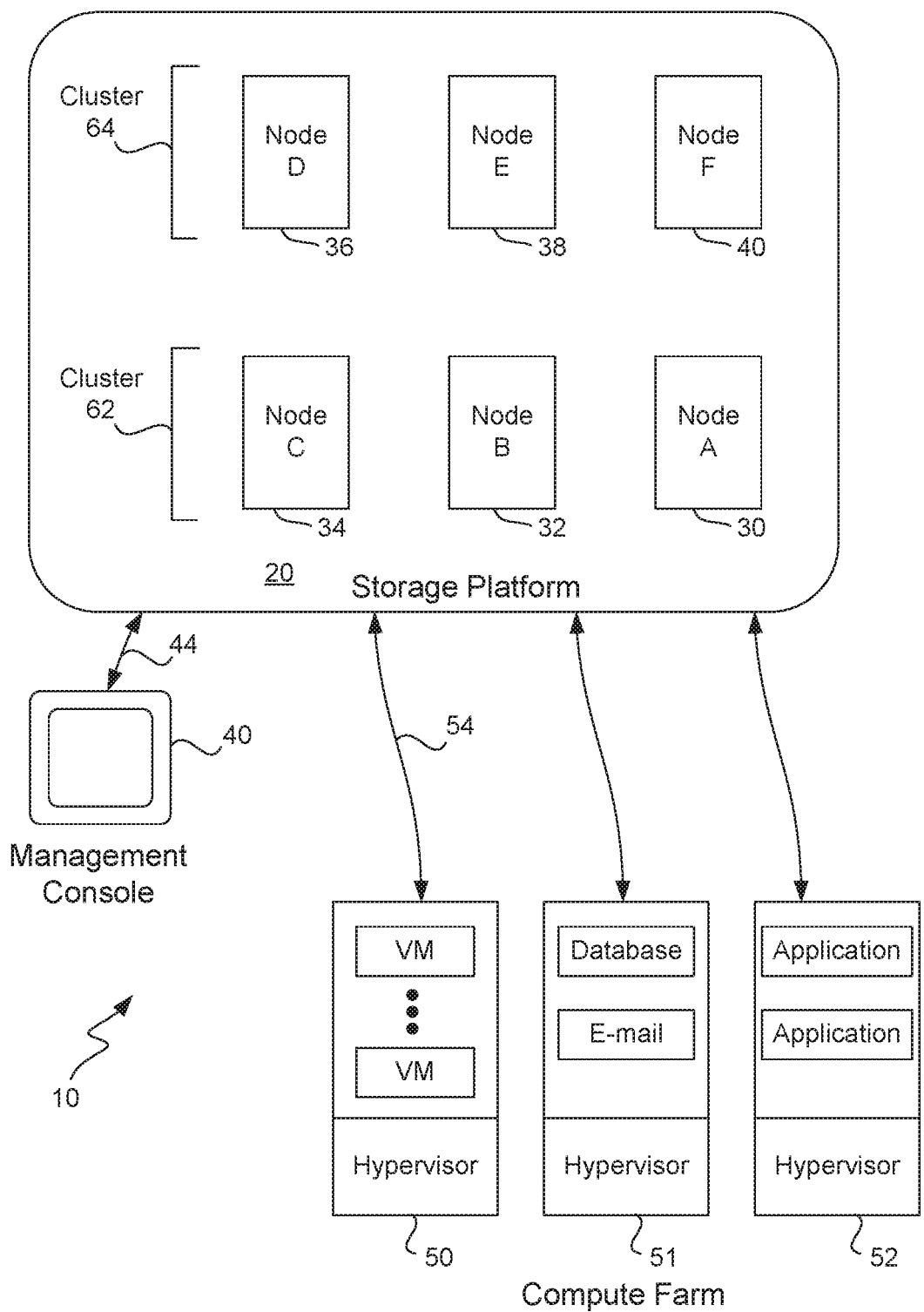
FIG. 1 illustrates a data storage system having a storage platform.

FIG. 1 illustrates a data storage system 10 according to one embodiment of the invention having a storage platform 20. Included within the storage platform 20 are any number of computer nodes 30-40. Each computer node of the storage platform has a unique identifier (e.g., "A") that uniquely identifies that computer node within the storage platform. Each computer node is a computer having any number of hard drives and solid-state drives (e.g., flash drives), and in one embodiment includes about twenty disks of about 1 TB each. A typical storage platform may include on the order of about 81 TB and may include any number of computer nodes. One advantage is that a platform may start with as few as three nodes and then grow incrementally to as large as 1,000 nodes or more.

Computers nodes 30-40 are shown logically being grouped together, although they may be spread across data centers and may be in different geographic locations. A management console 40 used for provisioning virtual disks within the storage platform communicates with the platform over a link 44. Any number of remotely located computer servers 50-52 each typically executes a hypervisor in order to host any number of virtual machines. Server computers 50-52 form what is typically referred to as a compute farm. As shown, these virtual machines may be implementing any of a variety of applications such as a database server, an e-mail server, etc., including applications from companies such as Oracle, Microsoft, etc. These applications write to and read data from the storage platform using a suitable storage protocol such as iSCSI or NFS, although each application will not be aware that data is being transferred over link 54 using a generic protocol. In some situations, the same application may be running on different server computers and this application may need to access the same virtual disk within storage platform 20.

Management console 40 is any suitable computer able to communicate over an Internet connection or link 44 with storage platform 20. When an administrator wishes to manage the storage platform (e.g., provisioning a virtual disk, snapshots, revert, clone, analyze metrics, determine health of cluster, etc.) he or she uses the management console to access the storage platform and is put in communication with a management console routine executing as part of metadata module 130 (shown in FIG. 2) on any one of the computer nodes within the platform. The management console routine is typically a Web server application.

In order to provision a new virtual disk within storage platform 20 for a particular application running on a virtual machine, the virtual disk is first created and then attached to a particular virtual machine. In order to create a virtual disk, a user uses the management console to first select the size of the virtual disk (e.g., 100 GB), and then selects the individual policies that will apply to that virtual disk. For example, the user selects a replication factor, a data center aware policy and other policies concerning whether or not to compress the data, the type of disk storage, etc. Once the virtual disk has been created, it is then attached to a particular virtual machine within one of the computer servers 50-52 and the provisioning process is complete.

Advantageously, storage platform 20 is able to simulate prior art central storage nodes (such as the VMAX and CLARION products from EMC, VMWARE products, etc.) and the virtual machines and application servers will be unaware that they are communicating with storage platform 20 instead of with a prior art central storage node. In addition, the provisioning process can be completed on the order of minutes or less, rather than in four to eight weeks as was typical with prior art techniques. The advantage is that one only need to add metadata concerning a new virtual disk in order to provision the disk and have the disk ready to perform writes and reads. No allocation of actual physical storage is needed.

Figure 2:
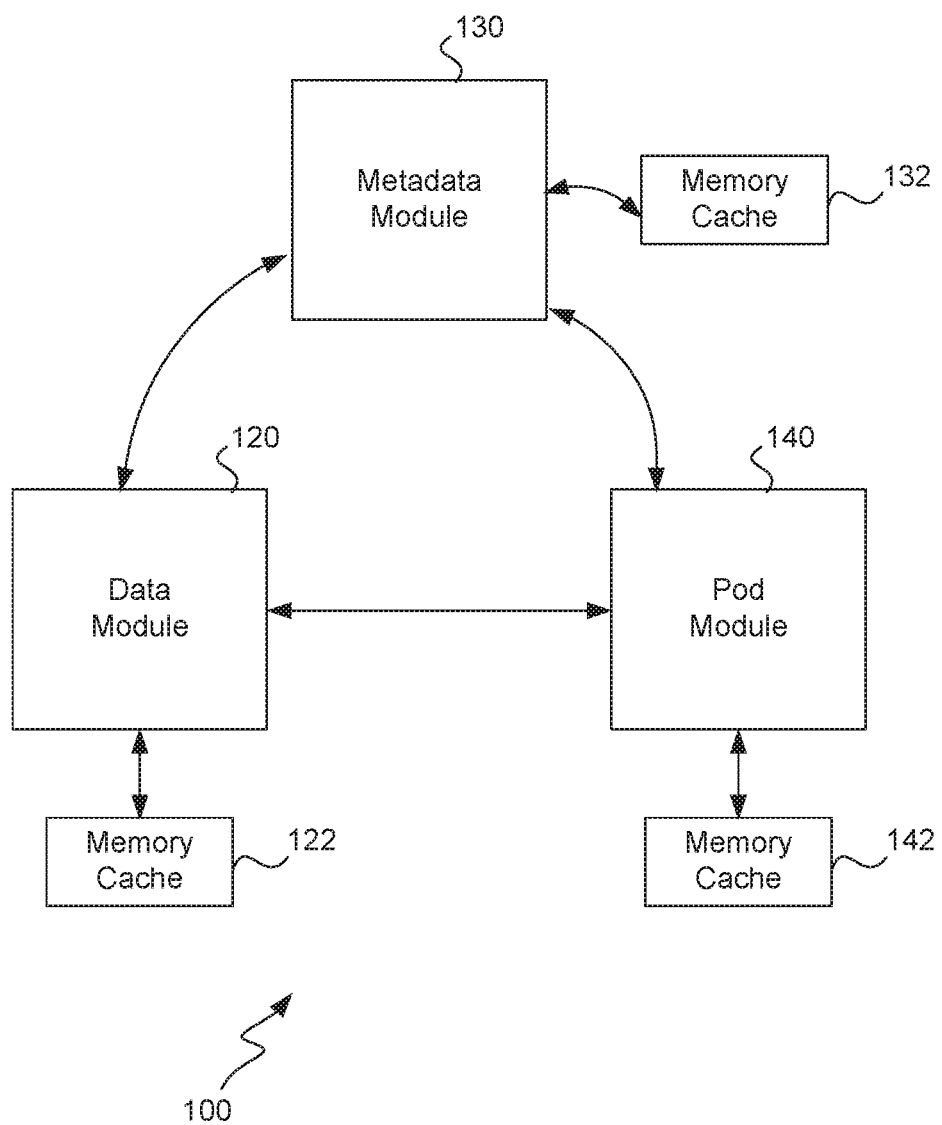
FIG. 2 illustrates software modules used within the storage system.

FIG. 2 illustrates software modules used within storage system 10. Shown is a data module 120, a metadata module 130 and a pod module 140. Data module handles the storage of data (such as blocks of data, files, objects, etc.) onto individual computer nodes 30-40. Metadata module handles the storage of metadata within the platform, that is, data that helps describe the data. Metadata includes all of the virtual disk information described below in FIG. 9, for example. Pod module is a coordinator module that coordinates persistent reservation requests and also stores transaction states as will be explained in greater detail below. Typically, although each storage node runs a pod module, each set of three storage nodes form a single pod, and the three pod modules coordinate together and execute as one.

Although shown as three modules, each of the modules runs independently on each of the computer nodes within the platform 20. Also, associated with each module on each node is a memory cache 122, 132 and 142 that stores information used by that module; each module on each computer node may also use persistent storage on that node. A file (for example) that is stored on nodes 32, 34 and 36, is referred to as being stored on its "data nodes 32, 34 and 36." The metadata for that file may be stored on three different nodes, and those nodes for that file are referred to as the "metadata nodes 30, 36 and 38." The data nodes and metadata nodes for a particular stored file may be the same or may be different. The modules communicate with each other via a modified version of Gossip over TCP, and work in concert to manage the storage platform.

Controller Virtual Machine

Figure 3:
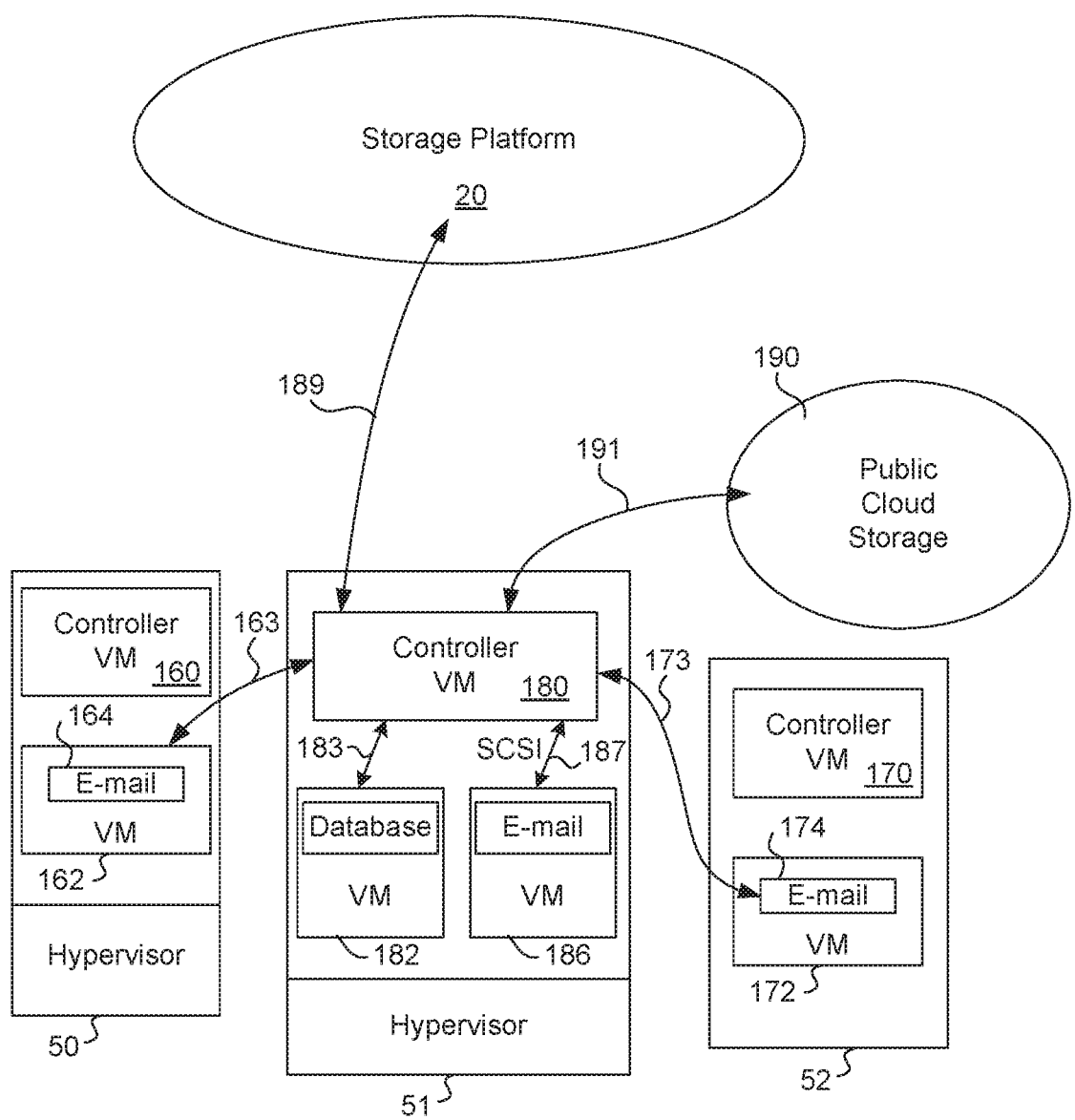
FIG. 3 illustrates in greater detail the computer servers in communication with the storage platform in the prior art.

FIG. 3 illustrates in greater detail the computer servers 50-52 in communication with storage platform 20 in the prior art. As mentioned above, each computer server may host any number of virtual machines, each virtual machine executing a particular software application. The application may perform I/O handling using a block-based protocol such as iSCSI and communicates using this protocol. Of course, other suitable protocols may also be used by an application. In the context of the present invention, though, the applications use the iSCSI protocol to communicate with block-type virtual disks.

As shown, server 51 includes a hypervisor and virtual machines 182 and 186 that execute respectively a database application and an e-mail application, and that desire to perform I/O handling using the iSCSI protocol 187 and 183. Server 51 also includes a specialized controller virtual machine (CVM) 180 that is adapted to handle communications with the virtual machines using the iSCSI protocol (and other protocols), yet communicates with the storage platform using a single proprietary protocol 189. Protocol 189 may be any suitable protocol for passing data between storage platform 20 and a remote computer server 51 such as TCP. In addition, the CVM may also communicate with public cloud storage 190 using the same or different protocol 191. Advantageously, the CVM need not communicate any "liveness" information between itself and the computer nodes of the platform. There is no need for any CVM to track the status of nodes in the cluster. The CVM need only talk to a node in the platform, which is then able to route requests to other nodes and public storage nodes.

CVM 180 handles different protocols by simulating an entity that the protocol would expect. For example, when communicating under the iSCSI protocol, CVM responds to an iSCSI Initiator (such as the database or e-mail application) by behaving as an iSCSI Target. In other words, when the e-mail application of virtual machine 186 performs I/O handling, it is the iSCSI Initiator and the controller virtual machine is the iSCSI Target. In other words, when an application is using the block protocol, the CVM masquerades as the iSCSI Target, traps the iSCSI CDBs, translates this information into its own protocol, and then communicates this information to the storage platform. When the CVM presents itself as an iSCSI Target, the application simply talks to a block device as it would do normally. The application is unaware that the CVM is trapping and intercepting its calls under the iSCSI protocol or that the CVM even exists. One advantage is that an application need not be changed in order to write to and read from the storage platform. Use of the CVM allows an application executing upon a virtual machine to continue using the protocol it expects, yet allows these applications on the various computer servers to write data to and read data from the same storage platform 20.

Each CVM also uses a memory cache of the computer server. Preferably, all information concerning a particular virtual disk attached to a CVM will be organized into a virtual disk object and then stored into the memory cache. A hash table is used to store these virtual disk objects and the key to find each object is the name of the virtual disk. Stored within this cache is virtual disk information 862 and the identifiers of the metadata nodes on which the metadata for this virtual disk is stored. Also in communication with each computer and CVM are also any number of local solid-state disks (or other similar persistent storage). These disks may be used as a data cache to also store data blocks that are written into storage platform 20. This cache may be used to rapidly retrieve data blocks instead of retrieving them from the remote storage platform.

Persistent Reservations

Typically, once a virtual disk is created within the storage platform, the "Add LUN" command is used to add the virtual disk as a LUN within the target, i.e., the controller virtual machine. Next, the "Add Access" command is used to provide the IP address or host name of the particular application, such as the e-mail application of virtual machine 186. Now the controller virtual machine 180 can see the virtual disk and can allow its clients (i.e., applications) to access that disk.

As known in the art, iSCSI reservations are used to control access by a single target to a shared iSCSI device such as a disk or tape drive, including the virtual disks discussed herein. In general, an Initiator makes a reservation of a storage asset such as a disk and no other Initiator may use that asset until the Initiator gives it up. A variety of commands are available under the iSCSI-3 RFC, and it will be useful to review these commands in the context of the present invention. A single target (e.g., controller virtual machine 180) is used to control access to a particular virtual disk by multiple Initiators, and this CVM maintains an in-memory data structure that keeps track of a registration list of virtual machines and the current reservation holder.

In order to access a particular virtual disk by an application running within a virtual machine, each Initiator must first issue the "register" command to CVM 180; when done, a unique identifier for the virtual machine (such as its IQN, "iSCSI Qualified Name") is added to the registration list of the CVM. Next, in order to actually reserve the particular disk for access (i.e., a particular LUN), the virtual machine issues a "reserve" command to the CVM. The CVM check to see if the virtual machine has registered, and if there is not currently an existing reservation then the reservation is given to the Initiator and its IQN is assigned as the current reservation holder. At that point no other Initiator may make changes to that LUN. When done, the current reservation holder issues a "release" command to the CVM in which case the current reservation holder is reset. A "preempt" command may be issued by a virtual machine if it is apparent that something has happened to the current reservation holder (i.e., computer crash, hang up, etc.). If so, this command resets both the registration list and the current reservation holder. The "clear" command may be issued in order to reset both the registration list and the current reservation holder.

It is important to note that a single target is responsible for controlling access to a particular virtual disk by any number of virtual machines. As shown in FIG. 3, the same e-mail application exists within virtual machines 162, 186 and 172. In order to access a particular virtual disk within the storage platform, and to perform their function, these e-mail applications must all issue commands and utilize controller virtual machine 180 which is the single target.

Requiring this e-mail application on different hypervisors (and potentially on different computers) to use a single virtual machine in order to access a particular virtual disk can create problems. For one, there may be multiple (or even dozens of) e-mail applications all attempting to access a virtual disk using controller virtual machine 180; this overburdens the CVM and can create greater latency and can even cause the CVM (or its hypervisor or its host computer) to crash, thus preventing access to data. Use of a single CVM to access one particular virtual disk can also create problems for other applications. For example, even though there is only a single database application on virtual machine 182, it must also use CVM 180 because they are within the same hypervisor. If dozens of e-mail applications overburden CVM 180, the performance of the database application will be affected even though it is only a single application.

Another disadvantage of the prior art approach is that should CVM 180 crash, all the data it has held regarding registration lists and current reservation holders for any number virtual disks within the storage platform will be lost. Each Initiator would then be required to again issue the register and reserve commands.

Persistent Reservations Using Multiple Targets

Figure 4:
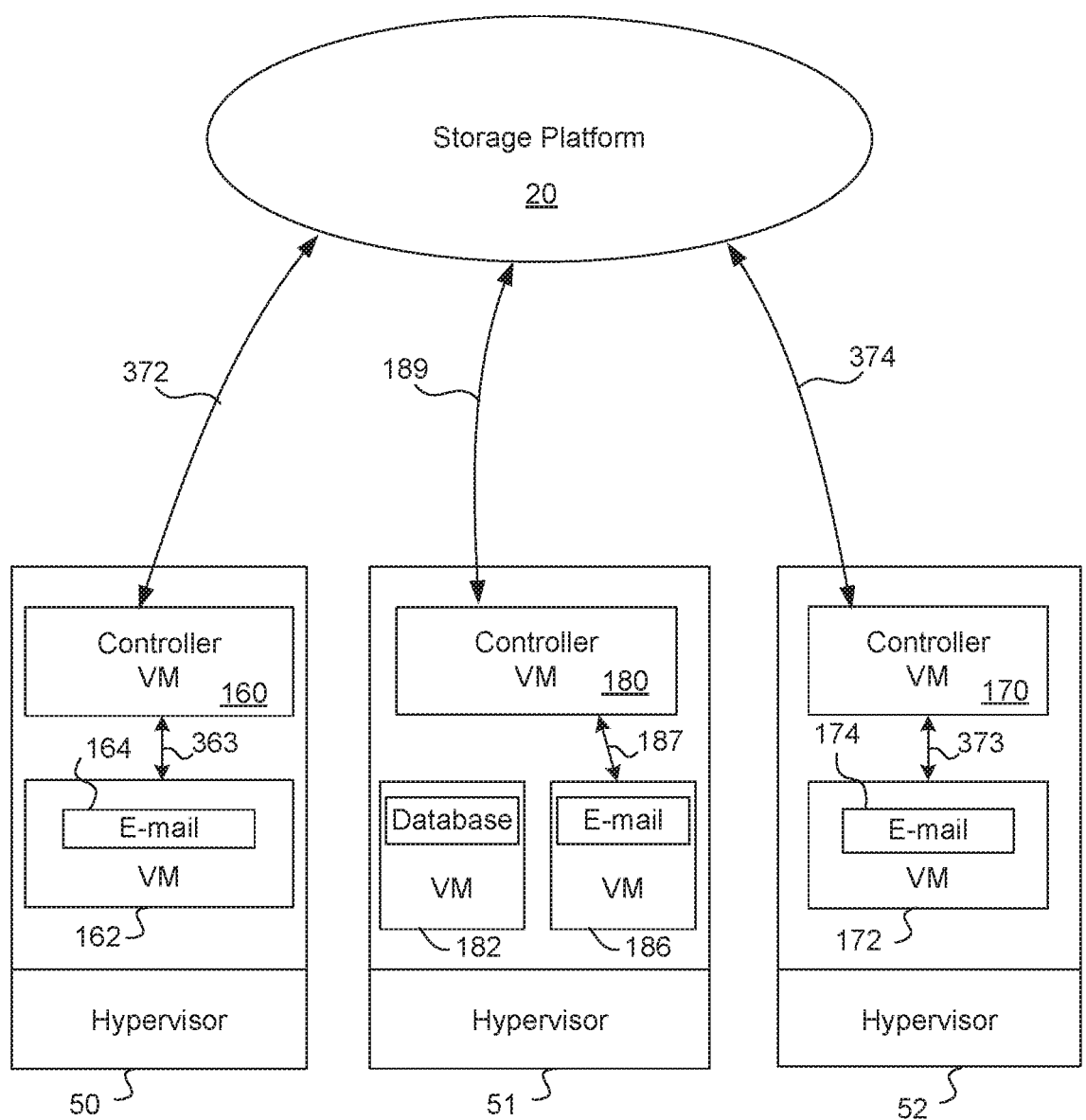
FIG. 4 illustrates in greater detail the computer servers in communication with the storage platform according to one embodiment of the invention.

FIG. 4 illustrates in greater detail the computer servers 50-52 according to one embodiment of the invention. As shown, each hypervisor within computers 50, 51 and 52 includes a controller virtual machine 160, 180 and 170. Each CVM is now enabled to communicate with the storage platform even when accessing a particular virtual disk for the same software application. For example, shown within virtual machines 162, 186 and 172 is an e-mail application that needs to access the same virtual disk within the storage platform. By way of the present invention, each e-mail application may now communicate with its own CVM via links 363, 187 and 373, respectively, in order to write to or to read data from the same virtual disk. Thus, any number of virtual machines may now use multiple targets to access a single virtual disk. This allows any number of different Initiators within different hypervisors to access a single virtual disk without using a single target, such as a single controller virtual machine. Because multiple targets may be used, latency will be improved, a crash is less likely, and recovery is faster because persistent reservation data will be stored within the storage platform and not locally at a CVM.

Figure 5:
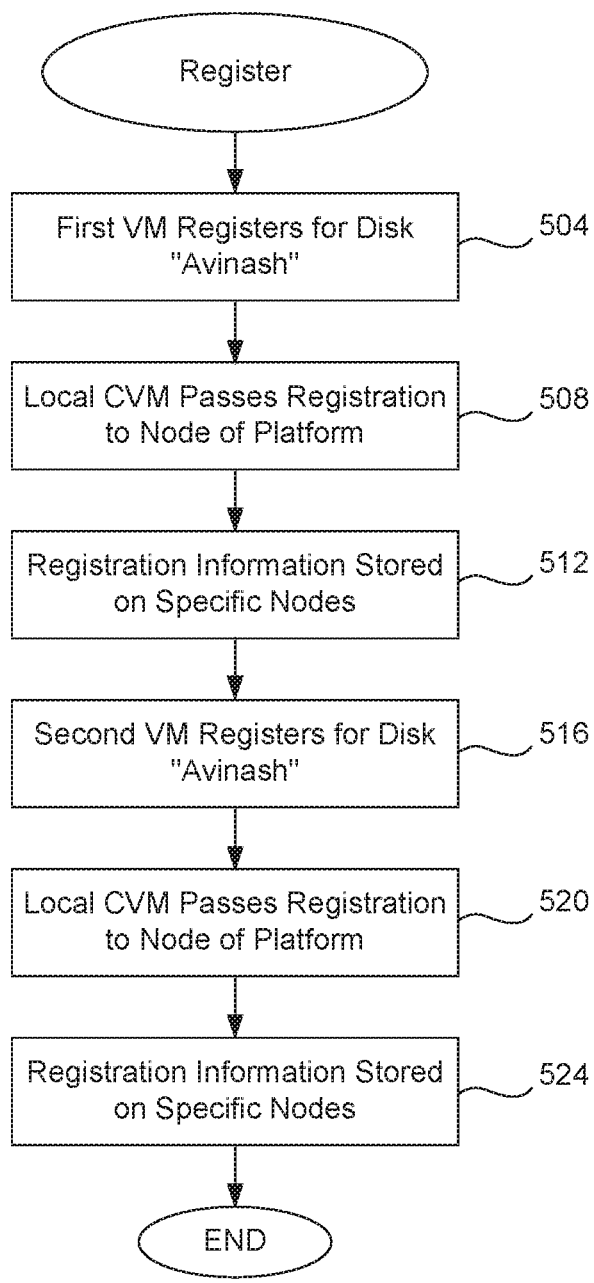
FIG. 5 is a flow diagram describing one embodiment by which the register command is implemented.

FIG. 5 is a flow diagram describing one embodiment by which the register command is implemented. In a first step 504, an application within a first virtual machine (such as virtual machine 162) desires to access a particular virtual disk within the storage platform and thus registers with its CVM 160 via link 363 and provides not only the disk name "Avinash," but also the IQN of the virtual machine. Next, in step 508, this CVM passes this registration information to any node within the storage platform. The metadata module 130 on this node receives this registration information, and in step 512 this registration data is stored on the specific node or nodes within the platform pertaining to the requested virtual disk.

Such information may be distributed and stored within the nodes of the storage platform in a variety of manners. In one particular embodiment, the registration and reservations information for a particular virtual disk is stored upon three different nodes within the platform (or upon fewer or greater nodes if the replication factor is different). In order to select the first node for storage, a hash function is taken over the virtual disk name to produce a numeral which is mapped to a unique one of the storage nodes. I.e., given the six nodes as shown in FIG. 1, the hash function produces a numeral between 1 and 96, and each range of sixteen numerals corresponds to a unique one of the nodes. For example, a hash value result anywhere in the range between 17 and 32 corresponds to Node B, etc. Once the first node is chosen, the other two nodes are automatically the next two nodes in sequence. In other words, if Node E is chosen, then the other two nodes are Node F and Node A.

Figure 9:
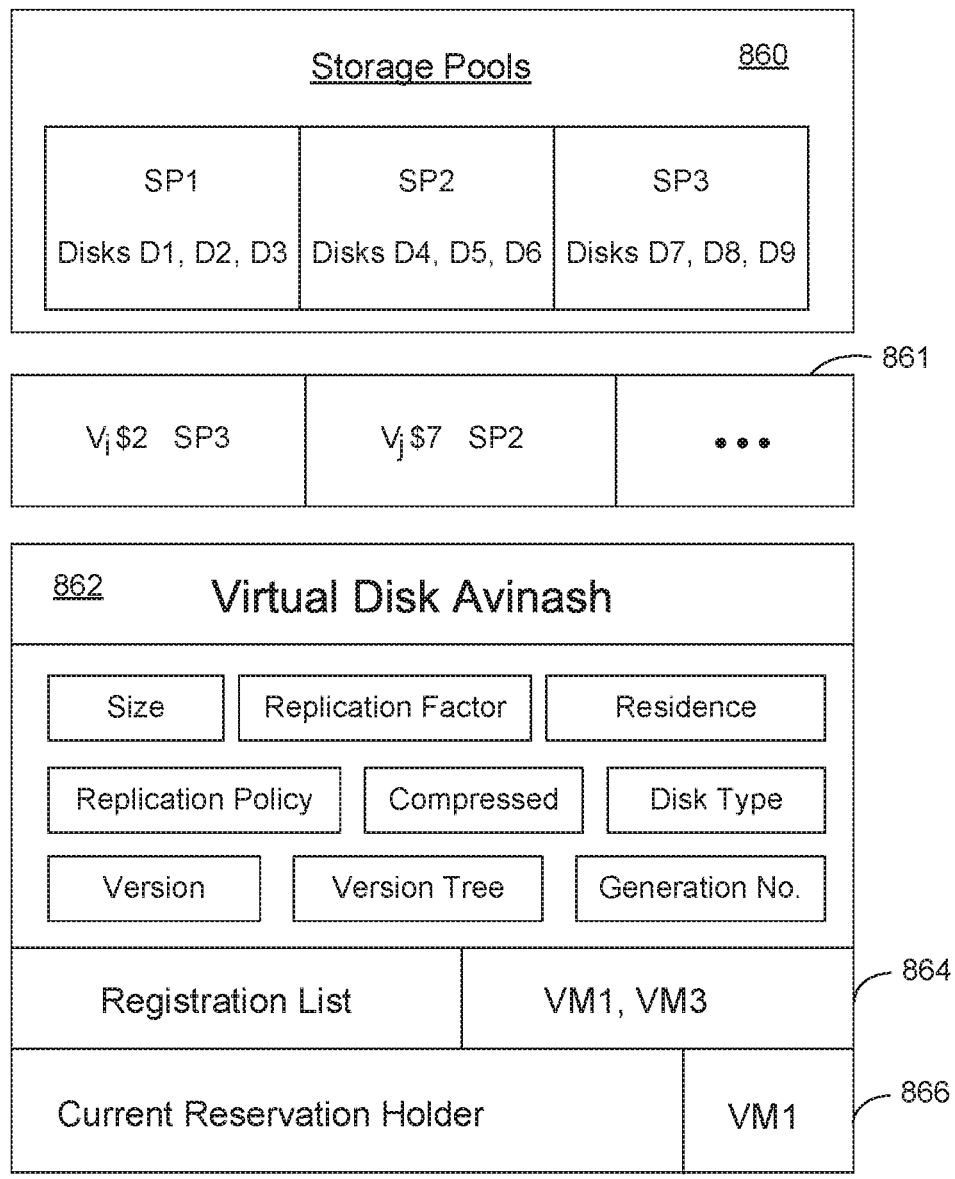
FIG. 9 illustrates metadata storage within the platform.

Once the three storage nodes are determined for the requested virtual disk, the metadata module of the first node contacted then stores this registration information onto these three storage nodes using the metadata modules of those nodes as shown in greater detail in FIG. 9. Thus, the registration information on these three storage nodes will be present not only in memory of those nodes but also in persistent storage of those nodes. Each metadata module of each storage node uses the same hash function and thus each knows where the metadata information is stored for a particular virtual disk.

Using this embodiment of the present invention, it is now possible for other virtual machines within system 10 to also make a reservation and perhaps access the same virtual disk "Avinash" by using their own local virtual machine as a Target. Accordingly, in step 516 a second virtual machine 172 registers with its CVM 170 in order to access the same virtual disk "Avinash." In step 520 CVM 170 passes the name of this disk and the IQN of virtual machine 172 to any node of the storage platform. Next, in step 524, the node that receives this information stores the received registration information on the three particular storage nodes that pertain to the virtual disk named "Avinash" using the hash function and procedure discussed above in step 512. Accordingly, the registration list for this particular virtual disk may appear as shown in 864 where the first and third virtual machines have registered.

Once registered, a virtual machine may issue the reserve, release, clear and preempt commands described below. In order to issue these commands, it is a prerequisite that the virtual machine first have registered for that particular virtual disk. Typically, the CVM corresponding to the virtual machine making a request will first check with the metadata module on the storage node which holds the virtual disk information to make sure that the requesting virtual machine is actually registered for that virtual disk. If so, then the command is passed to the metadata module, if not, then a "Fail" status is returned to the virtual machine.

Figure 6:
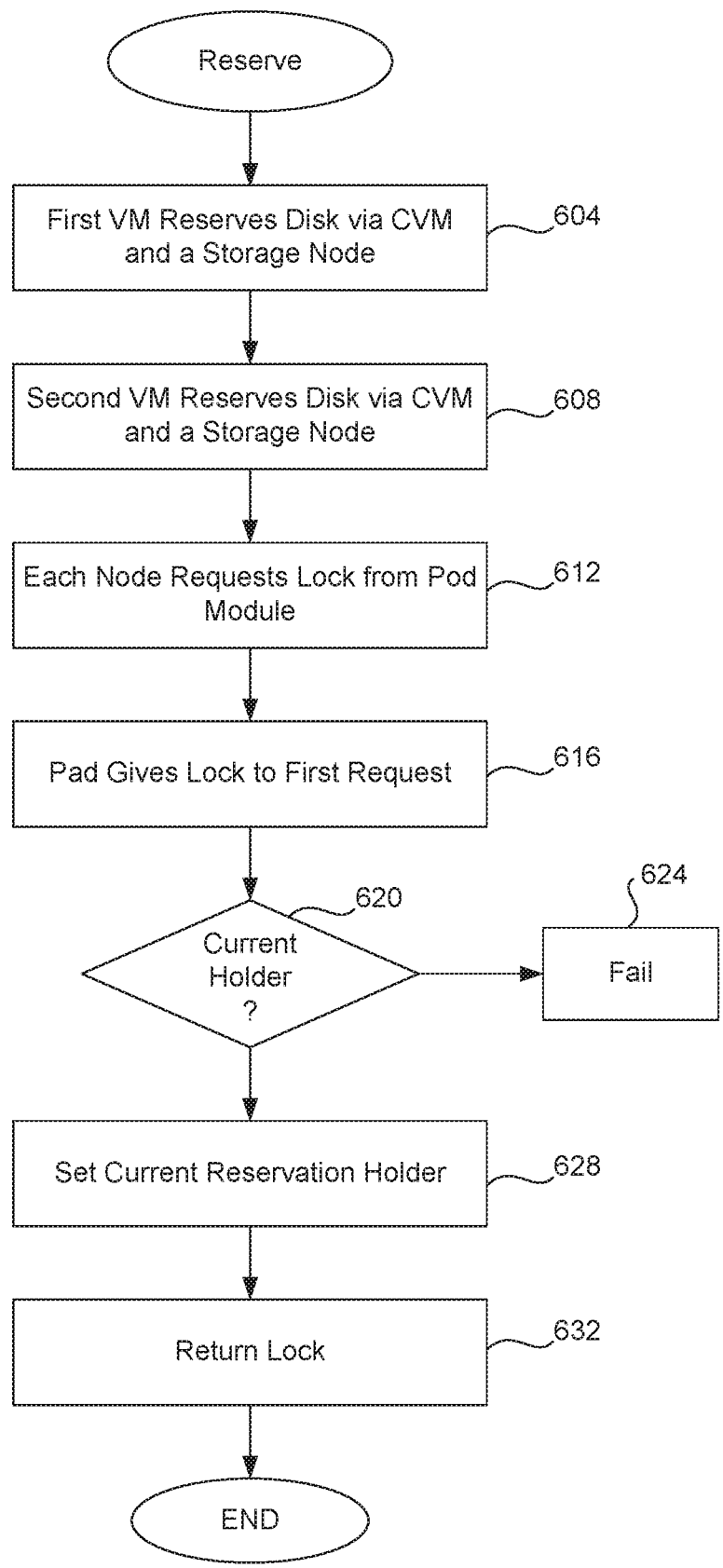
FIG. 6 is a flow diagram describing one embodiment by which the reserve command is implemented.

FIG. 6 is a flow diagram describing one embodiment by which the reserve command is implemented. Two or more virtual machines may attempt to reserve a particular virtual disk at more or less the same time, and this flow describes how that situation is handled.

In a first step 604, an application within a first virtual machine (such as virtual machine 162) desires to access a particular virtual disk within the storage platform and thus issues a reserve command via its CVM 160 and link 363, providing not only the disk name "Avinash," but also the IQN of the virtual machine. The CVM passes the reserve command and this information to any node within the storage platform. The metadata module 130 on this node receives this registration information. At more or less the same time, or perhaps simultaneously, in step 608 another virtual machine (such as virtual machine 172) within system 10 also desires to reserve the same disk and also issues a reserve command via its CVM 170, providing not only the disk name "Avinash," but also the IQN of the virtual machine. CVM 170 also passes this reserve command and information to any node within the storage platform. The metadata module 130 on this other node receives this registration information. It may be that both reserve commands are handled by the same storage node within the storage platform or they may be handled by different storage nodes.

At this time, each storage node that has received the reserve command may check field 864 of the storage node that holds information for the particular virtual disk in order to make sure that the requesting virtual machine has already registered. If not, then in error is generated and any virtual disk that has not registered is provided with a "Fail" status via its local CVM that had sent the reserve command. This check may also be done in conjunction with step 620 below, or performed by the CVM as mentioned above.

In step 612 each of the storage nodes that has received the reserve command from the different virtual machines will make a request of the corresponding pod module for the Lock on that virtual disk. In the same way that a particular storage node (or nodes, if replication is used) is responsible for storing information concerned with a particular virtual disk (such as shown in FIG. 9), a pod module of a particular storage node will be responsible for handling Lock requests for a particular virtual disk. This storage node may be the same node that stores information concerning the virtual disk, or may be a different node. A hash function over the virtual disk name may also be used to determine which node handles the Lock request for a particular virtual disk. Thus, each storage node that has received the reserve command will know from which pod module of which storage node to request the Lock for that particular virtual disk. Because only a single pod module (whether executing upon a single storage node or executing upon three storage nodes in concert) can give out the Lock for a particular virtual disk, only one virtual machine of system 10 is allowed to reserve a particular virtual disk at any point in time.

Accordingly, in step 616 the pod module will give the Lock for a particular virtual disk to the first request that it receives from the metadata module of one of the storage nodes, i.e., first come first served. The second, latter request (or any other later request), will fail and the requesting virtual machine will receive a "Fail" status via its local CVM that had sent the reserve command. Of course, if only a single virtual machine is attempting to reserve the particular virtual disk, then the Lock will always be given to that virtual machine.

Step 620 is a check to determine whether or not the current reservation holder field 866 has already been set. For example, field 866 of FIG. 9 shows that this field has already been set and a particular virtual machine has already reserved this virtual disk. If so, then the reserve command from virtual machine 162 will fail in step 624 as described above. The only exception is that if the same virtual disk that already has the disk reserved is now requesting a reservation, then "Success" will be returned. A check may also be performed at this time to determine whether the requesting virtual machine has already registered. If field 866 has not been set (i.e., there is no current reservation holder), then in step 628 field 866 for the virtual disk in question is set to be the IQN of the virtual machine 162 that had been provided the Lock from the pod module. Once set, a "Success" status is sent back to the requesting virtual machine via its local CVM.

Finally, in step 632 the successful metadata module of the storage node that had locked the virtual disk returns that Lock by again communicating with the pod module responsible for handling locks for that particular virtual disk. Thus, the Lock is not in effect for the entire reservation, but only long enough to ensure that two or more virtual machines do not attempt to reserve the disk at the same time. The pod module will only give the Lock to one virtual machine at a time (or, rather, to a metadata module representing a virtual machine), and, each metadata module may not set a reservation unless it holds the lock.

Figure 7:
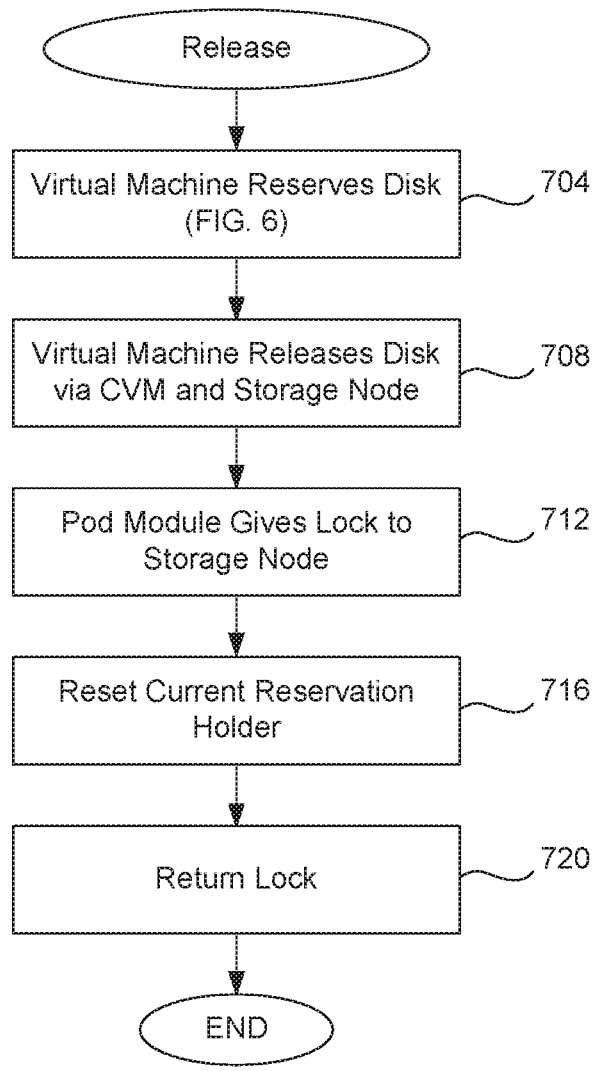
FIG. 7 is a flow diagram describing one embodiment by which the release command is implemented.

FIG. 7 is a flow diagram describing one embodiment by which the release command is implemented. While the virtual machine that holds the reservation for a particular virtual disk is attempting to release that reservation, other virtual machines may be attempting to reserve it at the same time which can cause problems. This flow describes how that situation is handled.

In a first step 704, an application within a virtual machine (such as virtual machine 162) desires to access a particular virtual disk within the storage platform and reserves the virtual disk as described above with reference to FIG. 6. After accessing the virtual disk, in step 708 at some point in time the same virtual machine desires to release that same virtual disk. The virtual machine issues the release command to its corresponding CVM 160, which in turn sends the release command, the IQN of the virtual machine, and the name of the virtual disk to any node in the storage platform. The metadata module 130 of that storage node then fields the release command and requests the Lock corresponding to that virtual disk from the appropriate pod module that holds the Lock for that virtual disk.

The pod module checks to make sure that the requesting virtual machine is actually the same virtual machine that is the current reservation holder (by checking field 866), and then gives the Lock to the metadata module that is representing the virtual machine. If the virtual machine requesting the Lock is not the current reservation holder then a "Fail" status is returned as in step 624. Once the metadata module has the Lock, then in step 716 it resets the current reservation holder field 866 for the virtual disk in question (on the node or nodes that hold metadata information for that particular virtual disk) and then returns the Lock to the pod module in step 720. While the metadata module holds the Lock, no other virtual machine is able to change the current reservation holder field by setting it to a particular virtual machine or by resetting it. Once the Lock has been returned, then the metadata module returns a "Success" status to the requesting virtual machine via its CVM.

Figure 8:
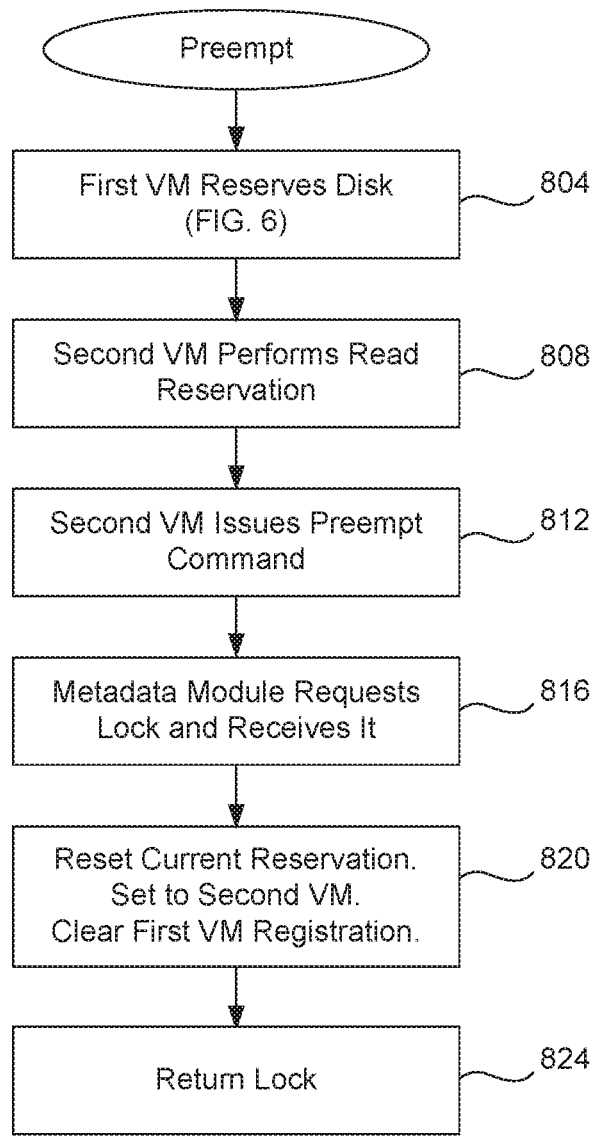
FIG. 8 is a flow diagram describing one embodiment by which the preempt command is implemented.

FIG. 8 is a flow diagram describing one embodiment by which the preempt command is implemented. If one virtual machine reserves a virtual disk, but then that virtual machine crashes, hangs up etc., or its host computer crashes, it may be necessary to remove its reservation even though other reservation requests may be arriving at more or less the same time. This flow describes how that situation is handled.

In step 804 a first virtual machine (such as virtual machine 186) reserves a particular virtual disk within storage platform 20 on behalf of a software application as has been described above in FIG. 6. If that first virtual machine or its host computer crashes, it may be necessary for a second virtual machine to preempt the reservation. Accordingly, in step 808 a second virtual machine (such as virtual machine 172) begins the preempt process by first performing a read reservation command by providing the name of the virtual disk. This command is passed from its CVM 170 to a metadata module on any storage node within platform 20 which reads the reservation field 866 from the storage node corresponding to the virtual disk and returns it to the virtual machine.

Next, in step 812 the second virtual machine issues a preempt command providing the name of the virtual disk and its own IQN. The preempt command from the virtual machine is passed to CVM 170, which in turn communicates with the metadata module of any node of the storage platform in order to find the actual storage node which holds the information for that particular virtual disk.

In step 816, this metadata module then requests the Lock for that particular virtual disk from the pod module responsible for that virtual disk (as has been described above) and receives the Lock from that pod module. Of course, if the Lock for that particular virtual disk is currently held by another metadata module (on behalf of another virtual machine) then the request will fail. Once the Lock is received, the metadata module in step 820 resets the current reservation holder field 866 to null, sets the current reservation holder field to be the IQN of the second virtual machine which is performing the preempt command, and then clears the IQN of the first virtual machine from the registration list 864.

Finally, the metadata module then returns the Lock in step 824 to the pod module responsible for that virtual disk. In this fashion, a preempt of the first virtual machine is performed and allows the second virtual machine to hold the reservation for the particular virtual disk.

The clear command is another command that utilizes the Lock mechanism. Similar to use of the reserve, release and preempt commands, a metadata module (representing a particular virtual machine), must first obtain the Lock from the corresponding pod module before being able to execute the clear command for a particular virtual disk. When executed, the clear command clears the registration list 864 and the current reservation holder 866 for the particular virtual disk. When done, the metadata module returns the Lock to the pod module. No other metadata module is permitted to perform commands such as reserve, release or preempt on a particular virtual disk when it does not hold the Lock for that disk.

Storage of Metadata

FIG. 9 illustrates metadata storage within platform 20. The metadata used within storage system 10 encompasses many types and includes: virtual disk information; container location information (including on which storage pools the containers are located and on which nodes); storage pool information (including which nodes have which pools and which disks); and, mutation information after write requests (where were blocks written, success and failure, etc.). As mentioned earlier, while the data associated with a particular write request may end up on three different data nodes, the metadata information associated with virtual disks, write requests, etc. will be stored using the metadata modules 130 on the computer nodes, and these nodes may be different from the nodes used for data storage. Metadata information may be replicated on two or more storage nodes within the platform.

FIG. 9 illustrates three types of information stored by a metadata module. Each of these types of information may use any suitable data structure and each type of information is independent of the others and may use a different data structure. Shown, for example, is persistent storage on node A that has been stored by its metadata module. Shown at 860 is the storage pool information or metadata for that node, showing which storage pools are present on that node and which disks are associated with each storage pool. Shown at 861 is container location information or metadata. Using the naming convention for containers discussed above, this shows that container "Vi$2" (associated with virtual disk "Vi") is located on node A and that it is part of storage pool SP3. The second listed container Vj$7 is shown as being part of the storage pool SP2. Of course, many other containers that are stored on node A may also be listed in this data structure. Shown at 862 are all of the policies and other metadata information specific to the virtual disk named "Avinash." Of course, any number of other virtual disks may also have their information or metadata stored on this particular node.

In particular, information associated with persistent reservations for a particular virtual disk is also stored using the metadata module of a particular storage node. Shown at 864 is the registration list of those virtual machines within system 10 which have registered to access the particular virtual disk. Also, shown at 866 is a particular virtual machine that is the current reservation holder for the particular virtual disk. This information is stored within persistent storage on a storage node A and may also be present in the memory of that storage node.

Computer System Embodiment

Figure 10:
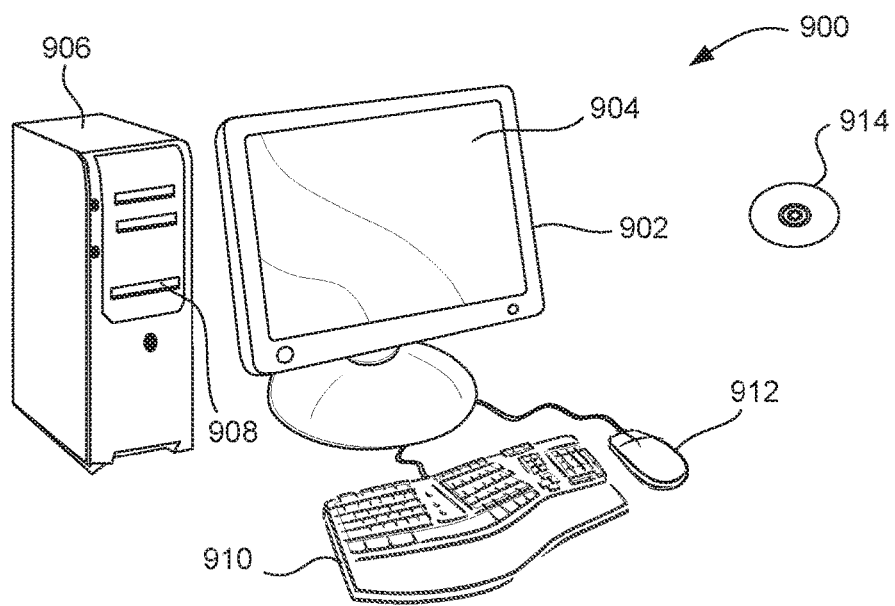
FIGS. 10 and 11 illustrate a computer system suitable for implementing embodiments of the present invention.
Figure 11:
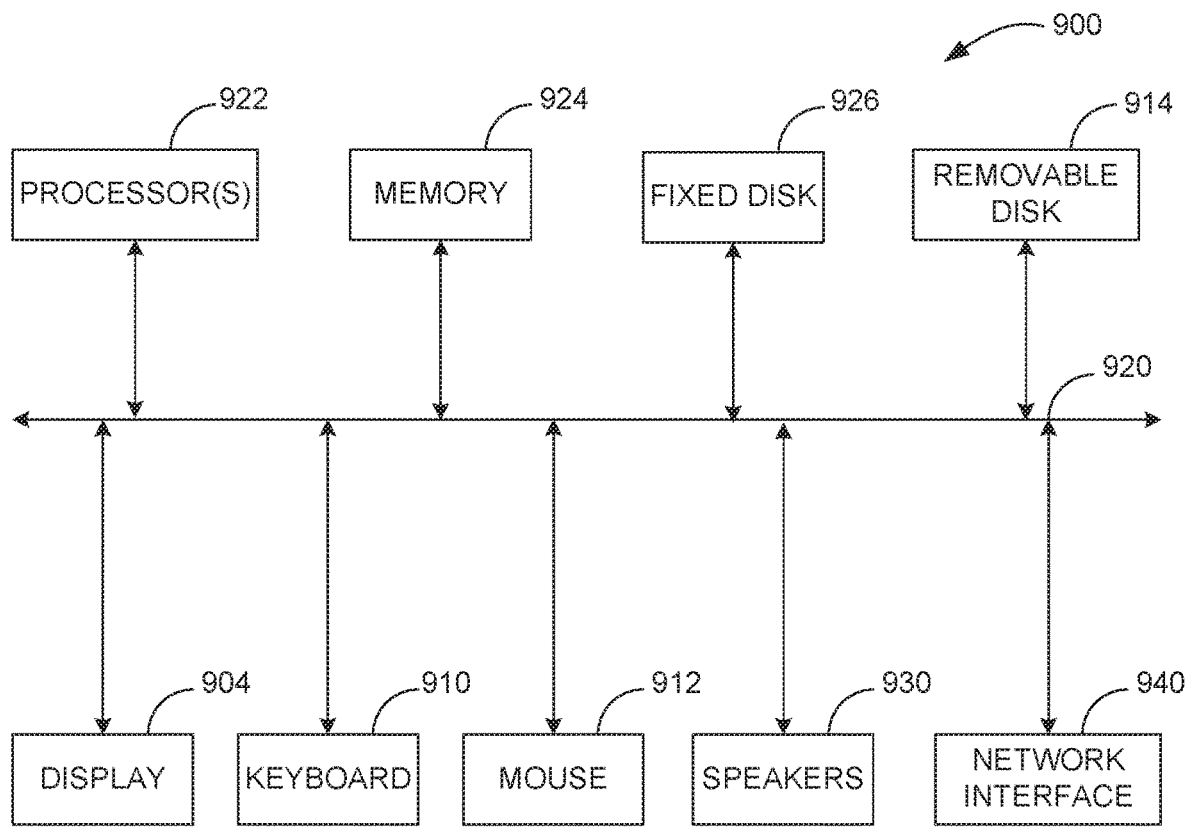

FIGS. 10 and 11 illustrate a computer system 900 suitable for implementing embodiments of the present invention. FIG. 10 shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of reserving a virtual disk in a storage platform having a plurality of storage nodes on each of which are stored virtual disks, said method comprising:
receiving a first request at a first process on one of said storage nodes to reserve a specific virtual disk in said storage platform for a first virtual machine of a first remote computer, said first request coming directly from a first controller virtual machine of said first remote computer;
said first process requesting of a coordinator process on one of said storage nodes a lock for said specific virtual disk;
receiving a second request at a second process on one of said storage nodes to reserve said specific virtual disk for a second virtual machine of a second remote computer different from said first remote computer, said second request coming directly from a second controller virtual machine of said second remote computer;
said second process requesting of said coordinator process said lock for said specific virtual disk;
said coordinator process giving said lock to said first process; and
changing a current reservation holder field of persistent storage on one of said storage nodes pertaining to said specific virtual disk to identify said first virtual machine.

2. A method as recited in claim 1 further comprising:
an application of said first virtual machine writing to, or reading from, said specific virtual disk only after receiving said lock.

3. A method as recited in claim 1 further comprising:
said coordinator process giving said lock to said second process after said first process has released a reservation for said specific virtual disk.

4. A method as recited in claim 1 wherein while said first process holds said lock no other virtual machine may reserve said specific virtual disk.

5. A method as recited in claim 1 wherein said first virtual machine and said second virtual machine execute within different hypervisors.

6. A method as recited in claim 1 wherein said first and second controller virtual machines use the iSCSI protocol.

7. A method of releasing a reservation for a virtual disk in a storage platform having a plurality of storage nodes on each of which are stored virtual disks, said method comprising:
receiving a request at a first process on one of said storage nodes to release a reservation for a specific virtual disk in said storage platform, said request originating at a first virtual machine of a first remote computer and coming directly from a first controller virtual machine of said first remote computer;
said first process requesting of a coordinator process on one of said storage nodes a lock for said specific virtual disk;
receiving a second request at a second process on one of said storage nodes to reserve said specific virtual disk for a second virtual machine of a second remote computer different from said first remote computer, said second request coming directly from a second controller virtual machine of said second remote computer;
said second process requesting of said coordinator process said lock for said specific virtual disk;
said coordinator process giving said lock to said first process; and
said first process resetting a current reservation holder field in persistent storage on one of said storage nodes that pertains to said specific virtual disk.

8. A method as recited in claim 7 further comprising:
said coordinator process giving said lock to said second process after said first process has returned said lock for said specific virtual disk to said coordinator process.

9. A method as recited in claim 7 wherein while said first process holds said lock no other virtual machine may reserve said specific virtual disk.

10. A method as recited in claim 8 wherein said first virtual machine and said second virtual machine execute within different hypervisors.

11. A method as recited in claim 7 wherein said first and second controller virtual machines use the iSCSI protocol.

12. A method of preempting a reservation for a virtual disk in a storage platform having a plurality of storage nodes on each of which are stored virtual disks, said method comprising:
changing a current reservation holder field of persistent storage on one of said storage nodes pertaining to a specific virtual disk to identify a first virtual machine of a first remote computer based upon a first request, said first request coming directly to said storage platform from a first controller virtual machine of said first remote computer;
receiving a second request at a second process on one of said storage nodes to preempt a reservation for said specific virtual disk in said storage platform on behalf of a second virtual machine of a second remote computer different from said first remote computer, said second request coming directly from a second controller virtual machine of said second remote computer;
said second process requesting of a coordinator process on one of said storage nodes a lock for said specific virtual disk;
said coordinator process giving said lock to said second process; and
said second process setting said current reservation holder field in persistent storage on one of said storage nodes that pertains to said specific virtual disk, said current reservation holder field being set to identify said second virtual machine.

13. A method as recited in claim 12 further comprising:
said coordinator process granting said lock to said second process because said first virtual machine is unavailable.

14. A method as recited in claim 12 wherein while said second process holds said lock no other virtual machine may reserve said specific virtual disk.

15. A method as recited in claim 13 wherein said first virtual machine and said second virtual machine execute within different hypervisors.

16. A method as recited in claim 12 wherein said first and second controller virtual machines use the iSCSI protocol.

17. A method as recited in claim 12 further comprising:
said second process resetting said current reservation holder field before setting said current reservation holder field; and
said second process clearing an identifier of said first virtual machine from a registration list for said specific virtual disk, said identifier being found in said current reservation holder field before said resetting.

18. A method as recited in claim 1 wherein each of said storage nodes is arranged to store in persistent storage metadata indicating a current reservation holder of the virtual disk to which said each of said storage nodes pertains.

19. A method as recited in claim 7 wherein each of said storage nodes is arranged to store in persistent storage metadata indicating a current reservation holder of the virtual disk to which said each of said storage nodes pertains.

20. A method as recited in claim 12 wherein each of said storage nodes is arranged to store in persistent storage metadata indicating a current reservation holder of the virtual disk to which said each of said storage nodes pertains.

* * * * *